United States Patent [19]

Burchart

[11] Patent Number: 4,488,146
[45] Date of Patent: Dec. 11, 1984

[54] INFORMATION INPUT AND OUTPUT UNIT FOR DATA PROCESSING EQUIPMENT

[75] Inventor: Joachim Burchart, Schlangen, Fed. Rep. of Germany

[73] Assignee: Nixdorf Computer AG, Fed. Rep. of Germany

[21] Appl. No.: 358,159

[22] Filed: Mar. 15, 1982

[30] Foreign Application Priority Data

Mar. 27, 1981 [DE] Fed. Rep. of Germany ... 8108980[U]

[51] Int. Cl.³ ............................................. G09F 9/32
[52] U.S. Cl. .................................. 340/407; 340/711; 340/825.19
[58] Field of Search ..................... 340/407, 711, 825.19

[56] References Cited

U.S. PATENT DOCUMENTS 4,044,350 8/1977 Tretiakoff et al. .................. 340/407
4,266,936 5/1981 Rose et al. ........................... 340/407

Primary Examiner—Glen R. Swann, III
Attorney, Agent, or Firm—Krass & Young

[57] ABSTRACT

In an information input and output unit (10) for data processing equipment, including an input keyboard (14) and a tactile read-out panel (28) with a control keyboard (30) for tactile data display for the vision impaired, it is provided, for making operation by vision-impaired persons easier, that the input keyboard (14), the control keyboard (30) and the tactile read-out panel (28) are arranged in one plane, that the tactile read-out panel (28) with the control keyboard (30), as seen by the operator, is in front of the input keyboard (14) and that in front of the tactile read-out panel (28) is arranged a hand rest surface (102). Between the tactile read-out panel (28) and the control keyboard (30), finger guides (90) may be optionally provided to make the orientation easier. Parallel to the output lines (56,58) of the read-out panel (28) are formed receiving grooves for receiving replaceable information strips (70) which show heading information in the form of Braille characters (74,78). The input keyboard (14) is inserted removably in a receiving basin (38) of a case containing the read-out panel (28') and the control keyboard (30).

13 Claims, 7 Drawing Figures

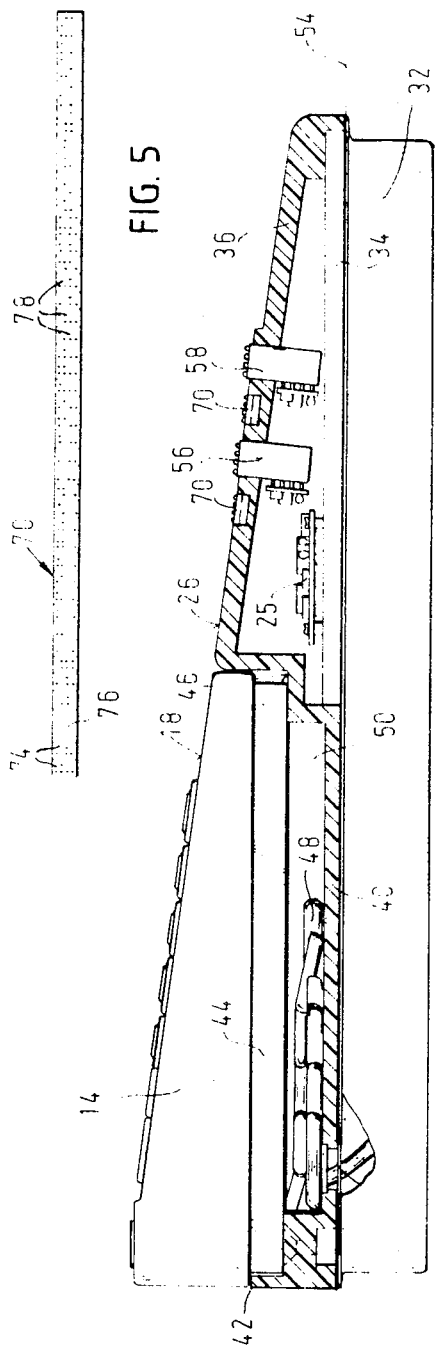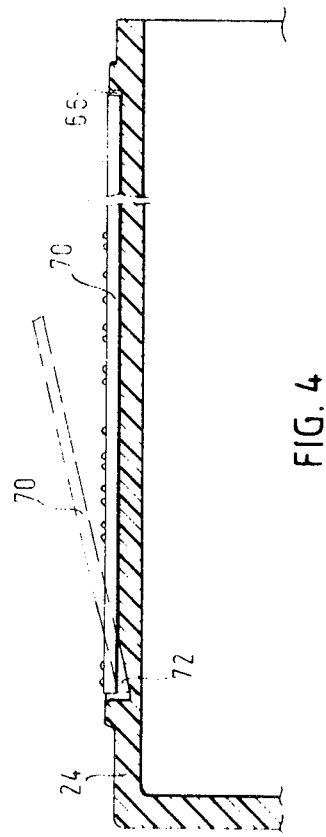

INFORMATION INPUT AND OUTPUT UNIT FOR DATA PROCESSING EQUIPMENT

TECHNICAL FIELD

The invention relates to an information input and output unit for data processing equipment, including an input keyboard and a tactile read-out panel with a control keyboard for tactile data read out for the vision impaired.

Such an information input and output unit will give the vision impaired the possibility of undertaking work on a data terminal or a screen display station in the same way as sighted persons.

BACKGROUND ART

A unit of the type mentioned at the outset is already known in which a tactile output is arranged on a stage raised behind the input keyboard. Thereby in feeling the output lines, the hand feeling for this must be held stretched far forward and free above the input keyboard which leads to more rapid fatiguing of the operator.

In another unit of the type mentioned at the outset, the read-out panel comprising two tactile read-out lines and the control keyboard are accommodated on a case separate from the input keyboard, in which case the read-out panel and the input keyboard lie in different planes. This yields the disadvantage that there is an upward or downward step between the read-out panel and the input keyboard, and the input keyboard has no fixed spatial position relative to the read-out panel. This makes orientation between the read-out panel and the input keyboard difficult for the vision impaired. The same holds true to a limited degree for the orientation between the readout panel and the control keyboard.

DISCLOSURE OF INVENTION

The invention is based on the problem of supplying an information input and output unit of the type mentioned above which will be convenient for a vision-impaired person and which can be operated for long periods without fatigue as well as making possible an easy operation.

The problem is solved according to the invention by having the input keyboard, the control keyboard and the tactile read-out panel arranged in one plane, by having the tactile read-out panel together with the control keyboard, as seen by the operating person, situated in front of the input keyboard and having a hand rest surface provided in front of the tactile read-out panel.

By arranging the two keyboards and the read-out panel in one plane, the orientation is made considerably easier for the vision impaired in going between the keyboards and the read-out panel. Moreover, the vision impaired can rest their hand near their body and in a relaxed way on the hand rest surface, in feeling the read-out panel 1, so that they can operate the information input and output unit even for a long period without fatigue. Preferably the tactile read-out panel is arranged in a first case with the control keyboard and the input keyboard is arranged in a second case separate from this, wherewith the first case exhibits a recess intended for receiving the second case, the dimensions of which recess are proportioned to the outer dimensions of the second case in such a way that the cover surfaces of both lie in one plane adjacent to one another. This has the advantage that the input keyboard can also be used by sighted operating personnel regardless of the additional unit which comprises the tactile read-out panel and the control keyboard. Moreover, this offers the capability of changing the spatial coordination between the tactile read-out panel and the input keyboard if this should ever become desirable or necessary.

In order to retain the second case firmly and immovably onto the first case without any special fastening means and thereby to secure the fixed spatial coordination of imput keyboard and read-out panel, it is advantageous for the second case to include on its under side a base set back by the amount of the wall thickness of the case wall of the first case and intended to engage in the recess made in the form of a receiving basin in the first case. For this it is advantageous to have a cable storage space formed under the receiving basin in the first case the bottom of which space includes a through opening for passing through a connecting cable of the input keyboard.

Preferably the first case consists of a trough-like under pan and an upper pan which can be joined to this, which projects out slightly beyond the under pan all around. This offers the capability of placing the information input and output unit, as a built-in unit, in a corresponding opening in a table in such a way that it rests on the table surface by the projecting edge of the upper pan. In order to make this built-in construction possible, moreover, the whole of the control elements are arranged in the upper pan.

For the case where the spatial coordination between input keyboard and read-out panel might sometimes be reversed and the input keyboard be arranged in front of the read-out panel, it is advantageous for the heights of the second case on its rear end to be approximately the same as the heights of the first case at its front end, so that the input keyboard and read-out panel in turn lie approximately in one plane.

The information input and output unit in all its functions should be an equivalent to a screen display station. Generally, four types of information are out put or displayed on a display screen. These are:

1. The present information being processed,
2. the indication by a so-called cursor or blinker displayed on the screen of where the processing is taking place at the moment,
3. heading information, for example, questionnaire data (name, date, etc.) or column headings, and
4. operation status information, which is generally displayed on a special line on the display screen or by lamp indications on the input keyboard.

Of all these information quantities, the heading information is generally invariable for a certain operation. In order to be able to display the heading information for the vision impaired in a simple and economical way, it is proposed according to the invention that in a tactile read-out panel with at least one output line parallel to this line and, bordering on it in the case cover surface, at least one receiving groove is formed for receiving an information strip which can contain the heading information in tactile symbols. This information strip may be made from plastic, paperboard or the like and can be inserted and interchanged for the particular operation. This eliminates the expensive electronically controlled output lines for displaying the heading information. The receiving groove for the information strip, however, ensures an exact alignment of the heading information relative to the symbols displayed in the tactile output lines.

In order to facilitate the interchanging of the information strips, it is advantageous for a depression to be formed in the base surface of the respective receiving groove along one of its edges. If the information strip is pressed into the depression along one of its edges, then the other edge rises out of the receiving groove, so that the information strip can conveniently be grasped.

To display a whole line on the display screen, which usually comprises eighty printing positions, preferably two tactile output lines are used, each of which forms a half line with forty positions. Correspondingly, two information strips or tapes are required as carriers for the heading information. The arrangement for this can be such that a receiving groove for receiving an information tape is provided about a tactile output line. Preferably, however, the two tactile output lines are directly one under the other, whereas, one information tape is arranged above and one information tape below the two lines.

The control keyboard makes it possible to assign the tactile output lines to different lines on the display screen as well as to interrogate the operating status and the cursor operation. The operator must, therefore, continually move her hands to and fro between the tactile output lines and the control keyboard. In order to make her orientation easier here and to make easy operation, it is provided, according to the invention, that the control keyboard is arranged at approximately the same distance from the front edge of the first case as the read-out panel next to this and that finger guides are provided between the tactile read-out panel and the keys of the control keyboard. For example, these finger guides may be formed by ribs or grooves on the cover surface of the case which extend from the respective ends of one output line to the keys of the control keyboard so that the operator is guided by his fingers along the ribs or grooves to the intended keys of the control keyboard. If for example, two output lines are provided which read one behind another form one display screen line then it is advantageous to assign one key of the keyboard contolling the line feed to the last symbol of the second output line.

The control keyboard may contain a change-over switch, in the first position of which the characters of a display screen line are progressively divided into a plurality of output lines and in the second position of which each output lines displays a first segment of a new display screen line. This offers the capability, for example, when the display screen is divided into two columns of displaying the lines of one column after another on the tactile output lines.

The tactile output lines used are preferably arrangements in which a region placed on the left can offer two position additional information on the operating status, the line number or the cursor position, and in the right region a half line corresponding to forty positions of the usual eighty position display screen readout is then read out.

Further features and advantages of the invention are seen from the following description which in connection with the annexed drawings explains the invention on the basis of embodiment examples.

BRIEF DESCRIPTION OF THE DRAWINGS

FIG. 3 shows a side view of the unit according to the invention in a partial section;

FIG. 4 shows a longitudinal section through a receiving groove for an information tape along lines IV—IV in FIG. 1;

FIG. 5 shows a top plan view of an information tape;

BEST MODE FOR CARRYING OUT THE INVENTION

Figure 1:
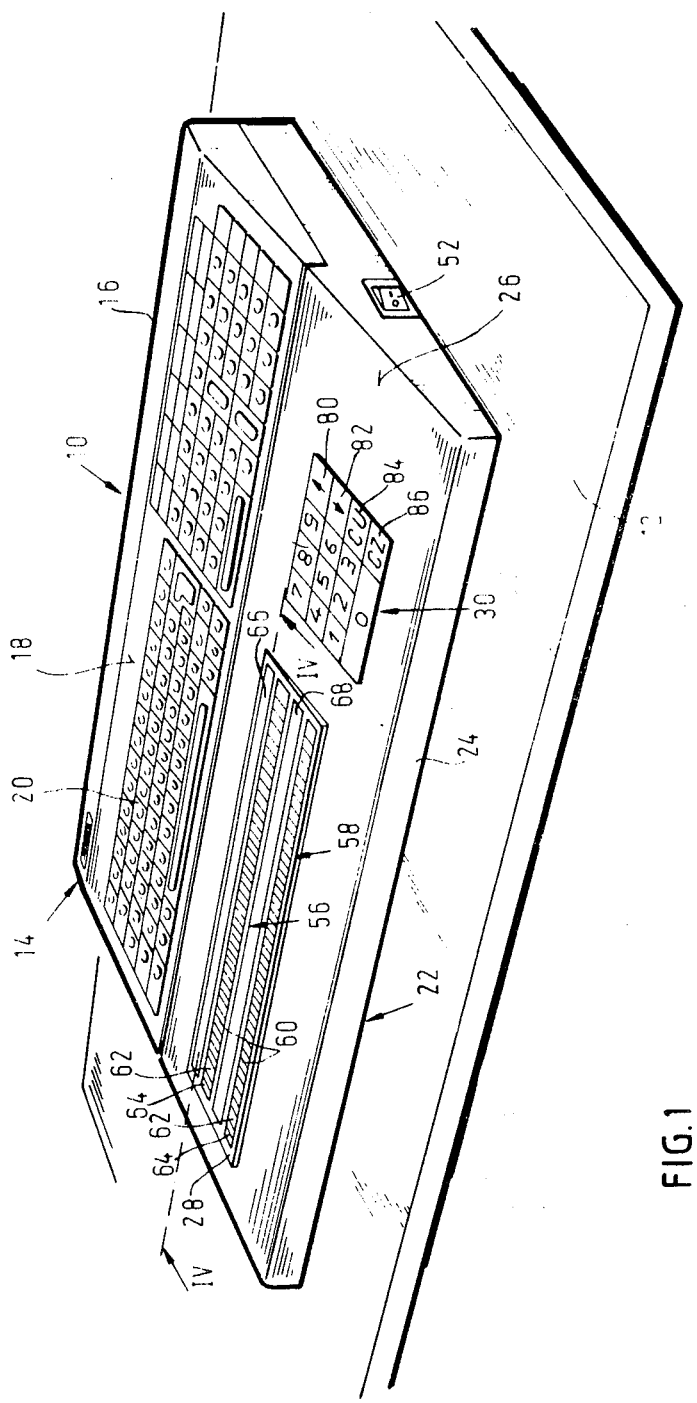
FIG. 1 shows a perspective overall view of an information input and output unit inserted in a table top.

In FIG. 1 is seen an information input and output unit, designated in general as 10, for operation by vision impaired person, which is inserted in a work table 12. The unit 10 is connected with a data processing unit, not represented and fulfils the same function as a display screen for sighted operators.

The unit 10 includes a conventional input keyboard 14 with a flat desk-like case 16 on the inclined cover surface 18 of which a keyboard 20 is arranged.

The unit 10 also includes a tactile output unit 22 with a flat, likewise desk-like case 24 on the inclined cover surface 26 of which is seen an output or read-out panel 28, as well as, the keys of a control keyboard 30.

Figure 2:
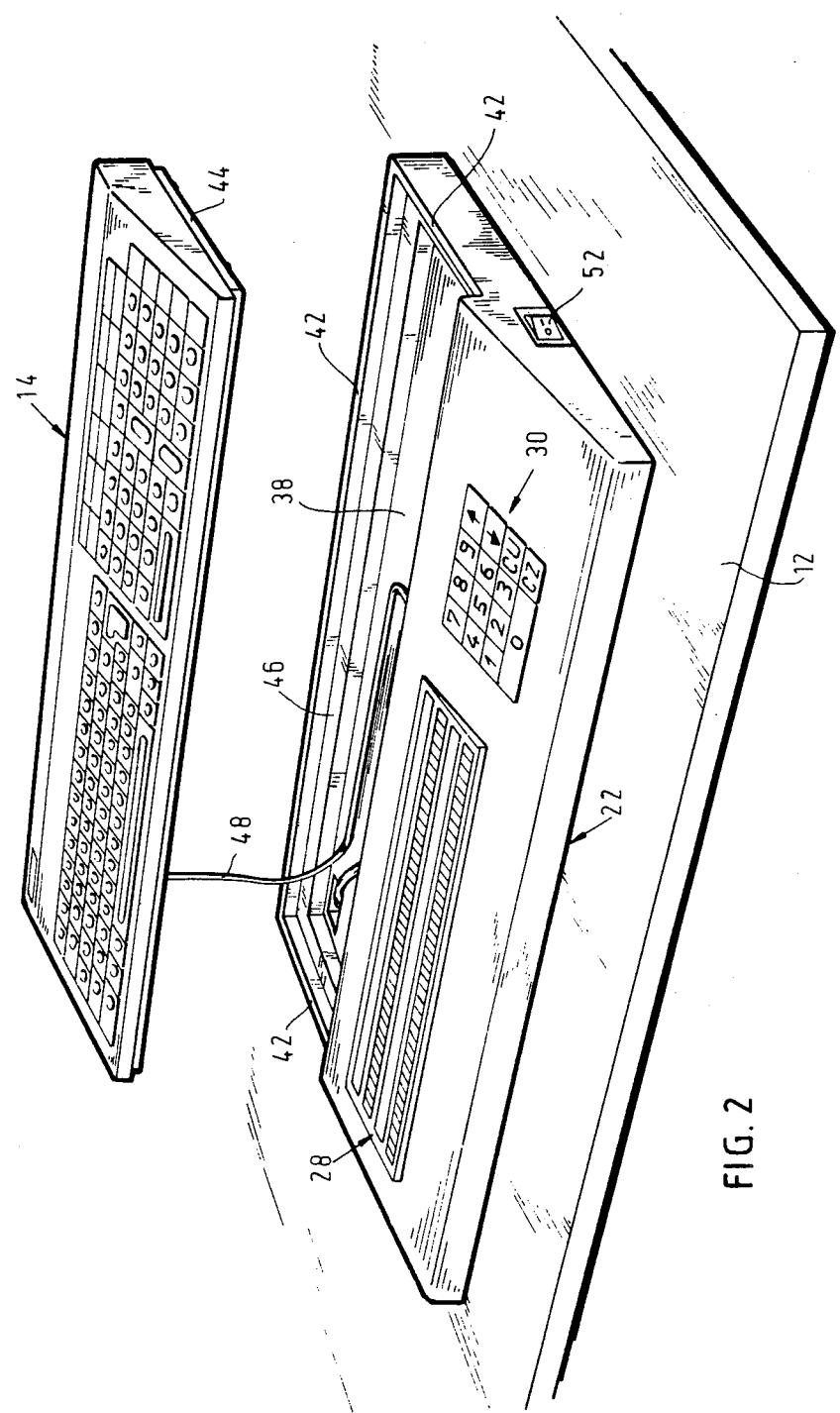
FIG. 2 shows a view corresponding to FIG. 1, but with the input keyboard taken out.

The case 24 of the tactile output unit 22 according to FIG. 3 includes a trough-like flat under pan 32 with an upper edge 34 projecting outward slightly, on which the upper pan 36 is placed, the front segment of which is formed by the cover surface 26 which slopes down obliquely toward the operator. In its rear segment, the upper pan shows a flat receiving basin 38 (FIG. 2) which is divided from the under pan by a basin bottom 40 and is enclosed by an edge strip 42. As can be seen in FIGS. 2 and 3, the case of the input keyboard 14 shows on its under side a base 44 displaced slightly inward with respect to the peripheral wall of the case, the outer dimensions of which base are chosen such that the input keyboard 14 with its base 44 fits exactly in the receiving basin 38, as can be seen in FIG. 3. In this way, the input keyboard 14 with its base 44 is resting on a step 46 running around on the inner side of the edge strip 42. In the inserted position represented in FIG. 3, the input keyboard 14 is immovable with respect to the output unit 22, but can easily be removed from the latter so that the input keyboard 14 can be used separate from the tactile output unit 22 without difficulty. In order to make this possible, the input keyboard 14 is connected by a long cable 48 with the tactile output unit 22. In the inserted state, the connecting cable 48 is accommodated in a cable storage space 50 provided under the input keyboard 14 on the receiving basin 38.

The whole of the control elements, for example, a power switch 52 also are accommodated on the upper pan 36 or are located above the edge 34 running around the under pan 32 so that when the unit 10 with the under 32 is inserted into an opening, not represented, in the table top 12, these elements are situated above the table top and thus are accessible, as is indicated by the dot-dash line 54 in FIG. 3.

When the input keyboard 14 is inserted in the receiving basin 38, the cover surface 18 of the input keyboard 14 and the cover surface 26 of the output unit 22 lie in one plane inclined obliquely toward the operator as is best seen in FIG. 3.

The tactile read-out panel 28 includes two Braille output lines 56 and 58 with forty printing positions 60

(so-called forms) each line corresponding to one-half of a display screen line which usually comprises eighty printing positions. Each of the output lines 56 and 58 shows on its left end, as seen by the operator, of the printing positions 60 two more printing positions 64 separated by an intermediate space 62, which positions, for example, are used for displaying the line number and/or operating status information, or for error messages. These electronically triggerable Braille lines are known as such and are, therefore, not explained further.

Parallel to each line of Braille there is a receiving groove 66 or 68 extending over the whole length of the line, which groove is formed in the cover surface 26 of the case 24 and is intended for receiving a Braille information strip 70 (See FIG. 5). As is seen in FIG. 4, the receiving grooves 66, 67 on their left end each show a small depression or basin 72. This is to facilitate the removal of the strip 70 from the receiving grooves 66 or 68. If one presses on the end of the respective strip 70 in the region of the basin 72, then the former pivots out of the position shown in a solid line representation in FIG. 4 into the position denoted in dot-dash lines and can then easily be grasped and taken out of the receiving groove.

FIG. 5 shows the structure of an information strip 16. On the left end in FIG. 5, the strip number is given, for example, in two identifying-positions 74. Adjacent on the right and separated from the identifying positions 74 by an intermediate space 76 are forty characters 78 which carry the information proper. If the information strip 70 is laid in one of the grooves 66, 68 then the printing positions 74 and 78, as well as, the intermediate space 76 line up respectively with the printing positions 64 and 60, as well as, with the intermediate space 62 of the output lines 56 and 58. The intermediate space 76 at the information strip 70 also also serves to prevent any erroneous insertion of the information strip.

The information content of an information strip 70 may, for example, be the heading of a table or the position numbering of the Braille lines. The strips may be produced for the particular purpose in a simple manner and be inserted in the receiving groove for the particular program to be run.

The control keyboard 30, seen to the right next to the read-out panel 28 by the operator, includes a block of digits, as well as, control keys 80, 82, 84 and 86. By keying the block of digits, the number of the line, for example, can be input, the content of which will be displayed on the tactile output lines 56 and 58. By means of the control keys 80 and 82, the respective next higher or lower line can be called up for its output. With the control key 84, the lines in which the cursor is located can be called up for their output. Moreover, the cursor, which is represented by a special character can be removed and the data character in this position be displayed. A superimposition of characters, such as is possible on a display screen, cannot be detected by feel and, therefore, must be replaced in this way. Finally, with the enabling key 86 the operating state of the control keyboard, which otherwise would be indicated in a lamp panel or by the key position for example, is caused to output on the tactile read out.

The management of the information intended for output on the Braille output lines 56 and 58, the receiving of control inputs from the control keyboard and the output on the tactile output lines is done in an intrinsically known manner by microprocessor electronics 25 arranged in the case 24. This is connected, in parallel to the display screen, to a data transmission line between display screen and data processing equipment. Any change in the display screen station and/or the data processing unit or the program is not necessary.

If necessary the control keyboard can also be replaced by the change-over function of the input keyboard. In this case, all of the output signals from the input keyboard must be tested by the microprocessor electronics. The output signals of the input keyboard are evaluated, in the change-over state of the latter, for the control of the tactile output lines. Their retransmission to the data processing unit is prevented.

Figure 6:
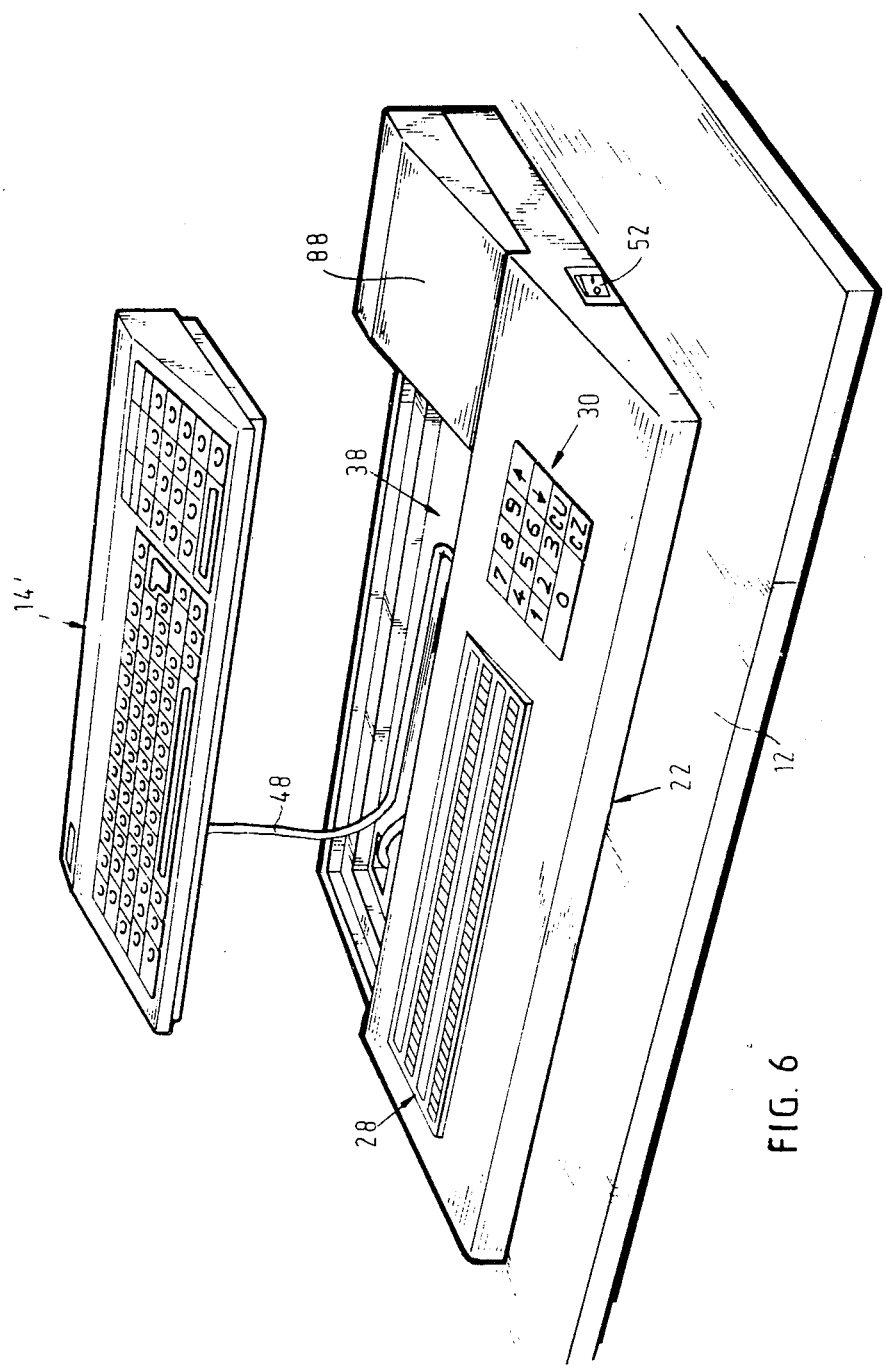
FIG. 6 shows a view corresponding to FIG. 2 of a second embodiment.

FIG. 6 shows a somewhat modified embodiment of the information input and output unit according to the invention, which differs from the embodiment according to FIGS. 1 to 5 in that the input keyboard 14' is narrower than the tactile output unit 22. The space then remaining thereby in the receiving basin 38 is then filled out by an insert 88 which in its outer shape fits the input keyboard 14' and supplements this in such a way that the peripheral contour of the whole unit once again corresponds to the contour of the unit 10 represented in FIGS. 1 to 5. The insert 88 may, for example, contain a loudspeaker through which the operator can obtain heading information or information on the operating state by acoustical means.

Figure 7:
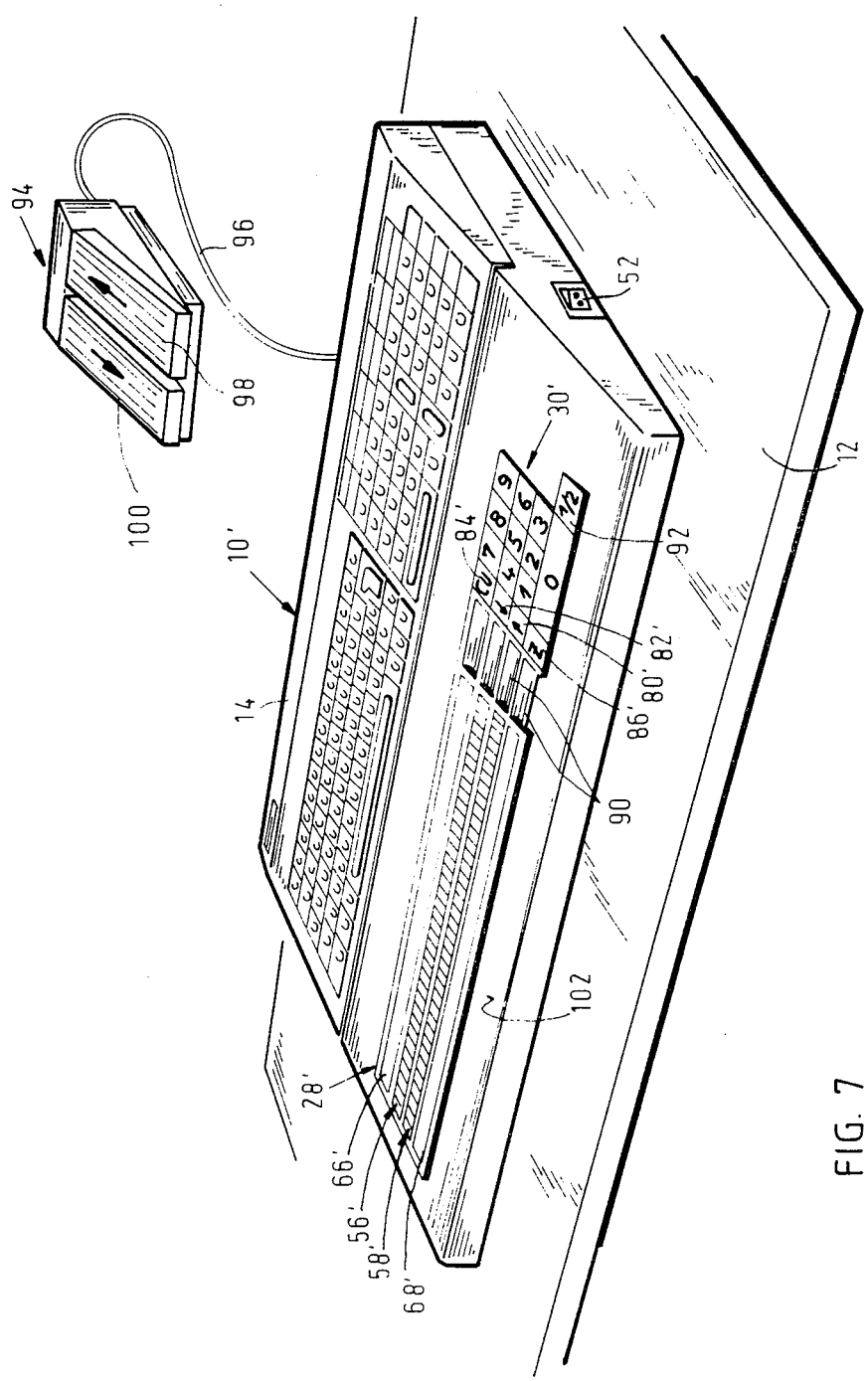
FIG. 7 shows a view corresponding to FIG. 1 of a third embodiment of the invention.

The embodiment according to FIG. 7 differs from the embodiments according to FIGS. 1 to 5 or according to FIG. 6 in a different design of the tactile read-out panel 28' and of the control keyboard 30'. Within the tactile read-out panel 28 are arranged the two tactile output lines 56' and 58' directly one under another, while the receiving groove 68' is now arranged under or in front of the second output line 58'. The Braille lines situated immediately next to one another make it easier for the operator to quickly feel the symbols, while the heading information contained on the information strip 70 is known to the operator besides, and need not be felt anew each time, so that this information strip, of this information, can be arranged below the output line 58' without any disadvantage to the work of the operator.

In contrast to the embodiments according to FIGS. 1 to 6, in the embodiment according to FIG. 7, the control keys 80' to 86' are arranged on the left side of the block of digits, and this in such a way that each control key is arranged in extensions of an output line or receiving groove. Here a guide groove 90 leads from the adjacent receiving groove or output line to the following control key. This in combination with the ribs arranged between the grooves makes it easier to go from the tactile read-out panel 28' to the control keys 80' to 86'. For this preferably, the control key 80 calling up the sequential lines is arranged beside the second Braille line so that the user after reading one line can call up the following line without having to cover a broad path with the hand. For this the finger is guided forcibly from the Braille line on the keyboard through the guide groove 90 to the control and back. Also it is advantageous for the control key 86' to be arranged as close as possible to the end of the second Braille line. After it is actuated, the number of the display screen line is given in the last printing positions of the Braille line or tactile display line 58', which number is finally displayed in the read-out panel 28'. In this case separate printing positions for the display of the line number can be eliminated.

In the embodiment example according to FIG. 7, the control keyboard 30' also includes a stop key 92 which makes possible a different assignment of the data characters to the tactile output lines 56' and 58'. In its first stop position, the positions 1 to 40 of a particular display screen line are displayed in the output line 56' and the positions 41 to 80 in the second output line 58'. In the second stop positions of the key 92, the positions 1 to 40 of a particular display screen line are displayed in the first display line 56' and in the output line 58' the positions 1 to 40 of the next display screen line are displayed. In this way, a coherent information appears on the read-out panel 28' even when for reasons of organization the display screen is divided into a left and a right read-out panel.

At least the control function of the control key 80' (next line) and the control key 82' (previous line) may also be taken over by a foot control device 94, which is connected by way of a cable 96 to the information input and output unit 10'. For this the functions of the control keys 80' and 82' correspond to the foot switches 98 and 100. For ready reading, the operator in this case need not take her hands away from the readout panel 28'. Moreover, she also does not so easily lose her orientation on the unit.

The above description shows that with the invention, a unit can be created which makes it possible for a vision-impaired operator to work at a display screen station without any kind of changes in the operating elements of the display screen station having to be made. The display screen may be operated by a sighted person as before. At the same time, the vision-impaired operator may rapidly and in a relaxed manner read the output information and finds orientation aids for the operation of the control keyboard and input keyboard, which respectively are in a fixed spatial relation to the tactile read-out panel.

The operator can lay her feeling hands on a support surface 102 (see FIG. 7) in front of the tactile read-out panel 28, 28' so that the hands and arms do not get tired so quickly. Since the read-out panel is situated directly in front of the input keyboard, there is no danger that the operator in feeling out the read-out panel 28 will accidentally actuate the input keyboard with the ball of the hand or the coat sleeve.

I claim:

1. Information input and output unit for data processing equipment, including an input keyboard and a tactile read-out panel with a control keyboard for tactile data display for the vision impaired, characterized in that the input keyboard (14; 14'), the control keyboard (30;30') and the tactile read-out panel (28;28') are arranged in one plane, that the tactile read-out panel (28;28') with the control keyboard (30;30') is in front of the input keyboard (14;14') relative to the operator, and that in front of the tactile read-out panel (28;28') a hand rest surface (102) is provided.

2. Information input and output unit as claimed in claim 1, characterized in that the tactile read-out panel (28;28') with the control keyboard (30;30') is arranged in a first case (24) and the input keyboard (14;14') in a second case (16) separate from the first case (24) and that the first case (24) comprises a receiving basin for receiving the second case (16), the dimensions of which basin are matched to the outer dimensions of the second case (16) in such a way that the cover surfaces (26,18) of both cases (24,16) lie adjacent to one another in one plane.

3. Information input and output unit as claimed in claim 2, characterized in that the second case (16) comprises on its under side a base (44) which is set back by the thickness of the case wall (42) of the first case (24) and engages in the receiving basin (38) of the first case (24).

4. Information input and output unit as claimed in claim 2, characterized in that in the first case (24) a cable storage space (50) is formed in the receiving basin (38), the bottom (40) of which case has formed therein a through opening for a connecting cable (48) of the input keyboard (14).

5. Information input and output unit as claimed in claim 2, characterized in that the first case (24) consists of a trough-like under pan (32) and an upper pan (36) which can be joined with it, which projects out slightly beyond the under pan (32) all around.

6. Information input and output unit as claimed in claim 2, characterized in that the height of the second case (16) at its back end is approximately the same as the height of the first case (24) at its front end.

7. Information input and output unit as claimed in claim 1, characterized in that the tactile read-out panel (28;28') comprises at least one output line (56,58; 56',58') and that parallel to the output line (56,58; 56',58') and bordering on this in the cover surface (26) of the case at least one receiving groove (66,68; 66',68') is formed for receiving an information strip (70) with tactile characters (74;78).

8. Information input and output unit as claimed in claim 7, characterized in that a depression (72) is formed in the base surface of the receiving groove (66,68; 66',68') along one of its edges.

9. Information input and output unit as claimed in claim 7, characterized in that at least two tactile output lines (56', 58') are arranged one under another and that the receiving grooves (68',68') are respectively arranged under the output lines (56',58').

10. Information input and output unit as claimed in claim 1, characterized in that the control keyboard (30') is arranged at approximately the same distance from the front edge of the first case (24) as is the read-out panel (28') beside the latter and that finger guides (90) are provided between the readout panel (28') and the keys of the control keyboard (30').

11. Information input and output unit as claimed in claim 10, characterized in that the finger guides (90) are formed of ribs or grooves on the cover surface (26') of the case and extend from the end of one line of the read-out panel (28') to the keys of the control keyboard (30').

12. Information input and output unit as claimed in claim 1, characterized in that in two tactile output lines (56,58; 56',58'), each contain a number of characters (60) corresponding to one-half of the number of characters contained in a display screen line of a visual data unit, and that next to the last character of the second output line (58') is arranged a key (80') on the keyboard (30') which key controls the line feed.

13. Information input and output unit as claimed in claim 1, characterized in that the control keyboard (30') contains a change-over switch (92) in the first position of which the characters of one display screen line are continuously divided into a plurality of output lines (56',58') and in the second position of which each output line (56',58') reproduces a first segment of a different display screen line.

* * * * *